United States Patent [19]

Jalkio et al.

[11] Patent Number: 4,872,747
[45] Date of Patent: Oct. 10, 1989

[54] USE OF PRISMS TO OBTAIN ANAMORPHIC MAGNIFICATION

[75] Inventors: Jeffrey A. Jalkio, St. Paul; Steven K. Case, St. Louis Park, both of Minn.

[73] Assignee: CyberOptics Corporation, Minneapolis, Minn.

[21] Appl. No.: 38,846

[22] Filed: Apr. 15, 1987

[51] Int. Cl.⁴ .................... G02B 13/10; G02B 17/00
[52] U.S. Cl. ..................................... 350/421; 350/445
[58] Field of Search ............... 350/420, 421, 445, 286

[56] References Cited

U.S. PATENT DOCUMENTS

| | | | |
|---|---|---|---|
| 3,497,289 | 2/1970 | Oberheuser | 350/421 |
| 3,661,465 | 5/1972 | Groh | 356/162 |
| 3,799,652 | 3/1974 | Torguet | 350/161 |
| 4,017,160 | 4/1977 | Betensky | 350/421 |
| 4,059,343 | 11/1977 | Kowalski et al. | 350/421 |
| 4,084,881 | 4/1978 | Hirabayashi et al. | 350/68 |
| 4,170,401 | 10/1979 | Yoder, Jr. et al. | 350/173 |
| 4,436,260 | 3/1984 | Donelan | 350/63 X |
| 4,488,813 | 12/1984 | Kissinger et al. | 356/375 |
| 4,770,507 | 9/1988 | Arimoto et al. | 350/421 |

FOREIGN PATENT DOCUMENTS

WO85/01119  3/1985  PCT Int'l Appl.

Primary Examiner—Scott J. Sugarman
Attorney, Agent, or Firm—Dorsey & Whitney

[57] ABSTRACT

An optical system designed to obtain anamorphic magnification without increasing overall system package size and without diminishing post-magnification light levels. Specifically, an output light beam passes a collimating lens and enters a prism at a near normal incidence to produce slight angular minification. The prism is aligned so that the light exits the prism at a steep angle thereby providing large angular magnification. The beam may then be focused. Additional prisms, appropriate angles between prism faces or prism orientation may be used to obtain various magnification or deflection angles depending on the desired application of the prismatic anamorphic optical system.

14 Claims, 3 Drawing Sheets

USE OF PRISMS TO OBTAIN ANAMORPHIC MAGNIFICATION

BACKGROUND OF THE INVENTION

The field of the invention is optical systems for use with laser devices. More specifically, the invention relates to optical systems designed to obtain anamorphic magnification with a substantially reduced focal length with minimal distortion or light loss.

It is often desirable to make non-contact measurements of the dimensions of an object. For example, a manufactured part can be inspected for tolerances at high speed. Single point range sensors are often used for this purpose and the most common such sensors use a light source and optical triangulation to determine range. An illumination source projects a spot of light onto the surface to be measured and receiving optics form an image of this spot on a light sensing detector. As the distance from sensor to surface changes, the position of the reflected spot image on the detector plane shifts. The lateral shift of position of the spot image on the detector can be used to meausre the distance between the sensor and the surface.

Typically, point range sensors are required to be small, accurate and inexpensive, and to have a large standoff distance between the sensor and the surface being measured. Simultaneously satisfying all of these requirements has led to a number of difficulties. A technique which overcomes many of these hurdles and may prove applicable to a wide range of other optical problems is presented herein. It is a method for obtaining high anamorphic magnification (i.e., different magnification of the image in each of two orthogonal directions) in a small space, for low cost.

In order to obtain high accuracy, the detector must be able to resolve small lateral shifts in the spot position. This generally requires high magnification in the direction of spot travel. When this requirement is combined with the common requirement that the sensor be separated from the object being measured by a large standoff distance two problems arise. First, since the image distance is the product of the magnification and the object distance, the resulting sensor package is quite large. Second, the high magnification leads to large spot image size and hence to low light levels on the detector since the available light is spread over a larger area.

There are several possible solutions to the first of these two problems. One is to fold the optical path of the sensor using mirrors, thereby shortening the sensor package. This decreases package length at the expense of increased package width. A second method is to use multiple lenses in the imaging system to produce a telephoto lens, reducing the distance from the lens assembly to the image plane. Third, one can also use two lenses as follows: the first lens acts as a relay, producing an image of unit (or less) magnification, and the second lens, free of the stand-off distance requirement, produces a magnified image. These solutions do not address the light level problem however, and thus are not entirely satisfactory.

The second problem can be tackled by increasing the lens diameter (increasing the size of the sensor package) or by using anamorphic optics to produce the required magnification in the direction of spot travel, while providing unit (or less) magnification in the orthogonal direction, thereby decreasing the area of the spot image relative to the non-anamorphic system, hence increasing the light level on the detector. Other solutions such as increasing the light level of the illumination source or the sensitivity of the detector are also possible.

It should be noted that no combination of the above partial solutions leads to an acceptable full solution. Increased package size is never desirable, and multi-element anamorphic optical elements can become expensive. Nor are holographic optical elements useful since their operation is wavelength dependent and the illumination source is usually a laser diode with considerable wavelength drift. What is needed is an apparatus or technique that solves both of the above problems simultaneously, while leaving cost and package size small.

SUMMARY OF THE INVENTION

The present invention is directed to an optical system designed to obtain anamorphic angular magnification without increasing the overall system package size and with retention of pre-magnification light levels.

The detection mechanism is produced by a laser light source, such as laser diode, and one or more lenses which focus the light on the surface of the object to be detected.

A receiving lens detects the spot of laser light and collimates it, directing the collimated beam into a prism at near normal incidence to produce slight angular minification. The prism is aligned so that the light exits the prism at a steep angle thereby providing the large angular magnification desired. The light may then be focused on a light sensitive detector array.

Additional prisms, appropriate angles between prism faces and prism orientation are also described and may be advantageously used to obtain various magnification or deflection angles depending on the desired application of the prismatic angular anamorphic optical system.

It is an object of the invention to use a prism to introduce anamorphic magnification in an optical system.

It is an object of the invention to permit the use of two prisms in series to introduce anamorphic magnification in an optical system and to reduce the variation in magnification across the field of view.

It is a further object of the invention to reduce the dispersive effects due to light source wavelength changes.

It is an object of the invention to control the net deflection angle of the optical system by the orientation and/or shape of the prisms used in such a system.

It is an object of the invention to control the net deflection angle of the system as well as the magnification by the use of total internal reflection.

It is an object of the invention to shorten the focal length required in an optical system.

It is an object of the invention to permit the creation of a optical system which is of small size and low cost which can be flexibly used for a number of different application.

These and other objects and advantages of the invention will become apparent to those skilled in the art upon a review of the following description of preferred embodiments, the claims to the invention and the drawings appended hereto.

DESCRIPTION OF THE PREFERRED EMBODIMENT

Figure 1:
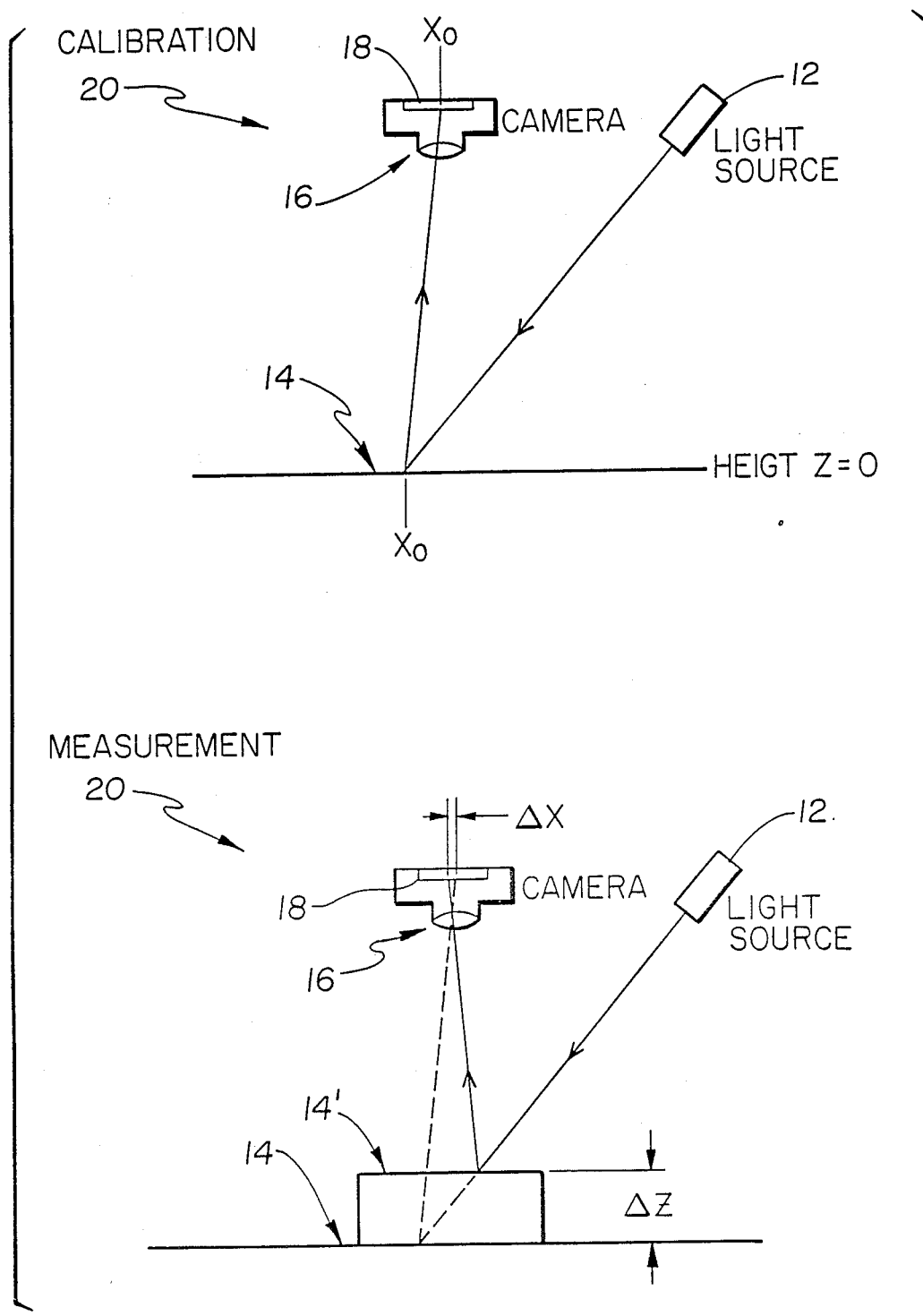
FIG. 1 is a typical system showing optical triangulation to determine range by an optical point range sensor.

The system shown in FIG. 1 is a typical system design for a point range sensor 20 as used in the past. An illumination source 12, which may be a laser light source, projects a spot of light onto a surface area 14 to be measured. Receiving optics 16 form an image of this spot on a light sensing detector 18. As the distance from the sensor to surface 14 changes by $\Delta Z$, the position of the reflected spot image on the detector 18 plane shifts. The lateral shift or position of the spot image on the detector 18 can be used to determine the distance or range between the sensor 20 and the surface 14'. In most applications, a large standoff distance, Z, is required between the sensor and the surface being measured. The large standoff distance causes a concomitant falloff in detectable light which can be detected at the detector surface 18.

The preferred form of the present invention uses at least one prism 30 and preferably a plurality of prisms 30, 32, 33 to substantially reduce the standoff distance and to enhance the post-magnification light levels received at the detector surface 18.

For laser range sensors of the type that the optical system is designed for it is necessary to obtain resolution on the order of one mil (2.5 micrometers). If used with a detector 18, with a pixel spacing of eight micrometers. Thus a magnification of 10× is required using a forty-five degree offset for viewing.

Using standard optics, magnification in both the X and Y directions decreases the power density on the detector array. A large standoff distance causes a similar effect and thus a standoff distance on the order of one inch between the receiving lens and object surface is preferred.

With prisms, when collimated light passes from one optical medium to another which has a different index of refraction, n its angle $\theta_n$ with respect to the medium interface is altered via Snell's law. Since this law in non-linear, it is possible to magnify angular shifts in a collimated beam in a single dimension by passing it through a properly oriented prism 30. This is explained in detail below.

The refraction of light at an optical interface is well known. The angles of refraction $\theta_1$ and $\theta_2$ are related by Snell's law:

$$n_1 \sin \theta_1 = n_2 \sin \theta_2 \qquad (1)$$

Where $\theta_1$ is the angle of incidence from a medium having a refraction index of $n_1$ and $\theta_2$ is the angle of refraction in the medium having a refraction index of $n_2$.

Differentiating this relationship, we find:

$$m = \frac{d\theta_2}{d\theta_1} = \frac{n_1 \cos\theta_1}{n_2 \cos\theta_2} \qquad (2)$$

which tells us that light incident on such an interface undergoes an angular magnification which varies with the angle of incidence. If $n_1$ is greater than $n_2$ and $\theta_1$ is near the critical angle, i.e.

$$\sin\theta_1 \approx \frac{n_2}{n_1}, \quad \theta_2 \approx 90'' \qquad (3)$$

the denominator in equation 2 becomes small, hence large magnifications are possible. Thus, using a prism 30 to achieve angular magnification in one direction can both reduce the size of the sensor package and substantially maintain the necessary light levels at the detector surface 18. Such a system is shown in FIG. 2.

Figure 2:
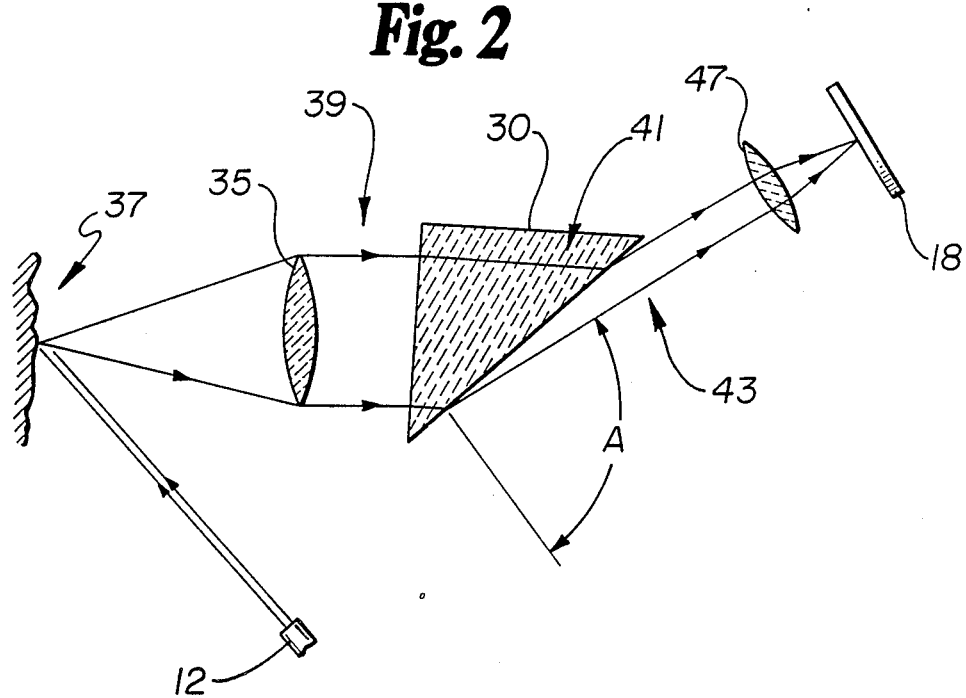
FIG. 2 is a single prism system using anamorphic magnification to shorten the focal length or standoff distance between the object being tested and the detector.

In the system of FIG. 2, a collimating lens 35 is used which transforms the translation of the object point 37 into an angular shift of its output beam 39. The output beam 39 of the collimator 35 enters the prism 30 at a vertical face or surface at near normal incidence. This produces a slight angular minification of the beam 41 since the light is passing from a material of low refraction index (air) to one of higher index (glass). The prism 30 is aligned such that the light beam 43 exits the prism 30 at a steep angle, providing large angular magnification in the plane of the figure. For example, an output angle of 84 degrees from perpendicular yields a magnification in excess of ten, the desired magnification level. A focusing lens 47 then collects the prism output beam 43 and focuses it on the detector 18. The resulting system is small and simple, yet provides high magnification and reasonable light intensity on the detector surface 18.

There are two possible problems associated with the system shown in FIG. 2. First, the index of refraction of the prism 30 varies with wavelength. Hence if a laser diode light source 12 is used, the magnification and deflection angle A of the prism 30 will vary with wavelength, which is a function of diode temperature. For a temperature drift of 20 degrees Celsius, the magnification will change by less than 0.02% which will not be noticable unless a high resolution detector 18 is used. However the change in overall deflection angle A is sufficiently large to cause concern.

The second possible problem is that since the angular magnification is dependent on angle, a beam 39 that is not perfectly collimated when it impinges on the prism 30 will more strongly converge or diverge as it exits. This can produce a poor quality spot image. Also the angular magnification will vary across the field of view which will make calibration difficult. By differentiating equation 2:

$$\frac{dm}{d\theta_1} = \frac{d^2\theta_2}{d\theta_1^2} = \frac{n_1^2 \sin\theta_2 \cos^2\theta_1}{n_2^2 \cos^3\theta_2} - \frac{n_1 \sin\theta_1}{n_2 \cos\theta_2} \qquad (4)$$

it can be seen that when magnification is large (i.e. COS $\theta_2$ large) the rate of change of angular magnification with angle is also large.

Figure 3:
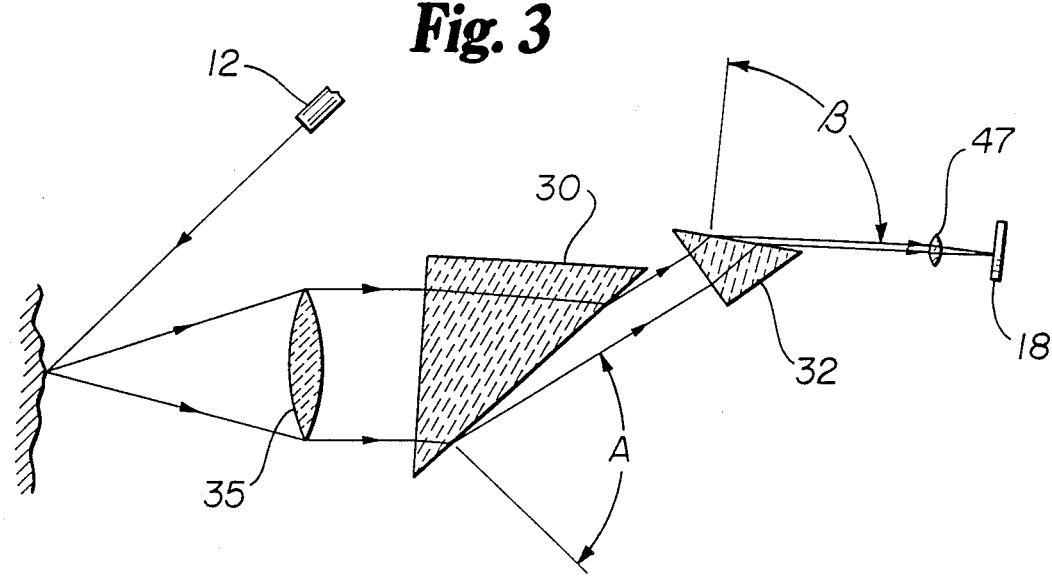
FIG. 3 is an anamorphic prism system utilizing two prisms in series.
Figure 4:
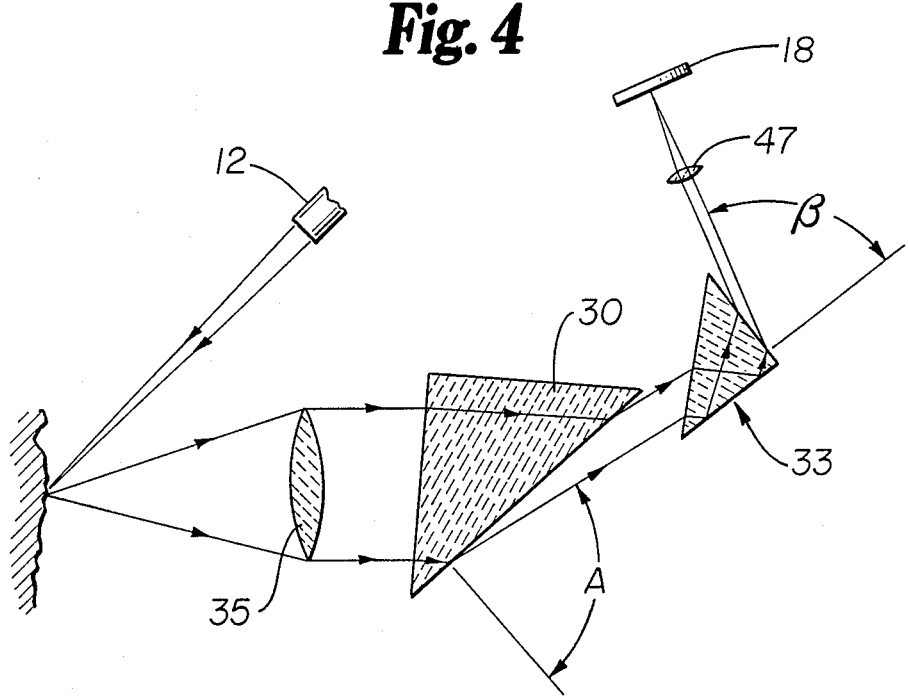
FIG. 4 is a double prism system using total internal reflection.
Figure 5:
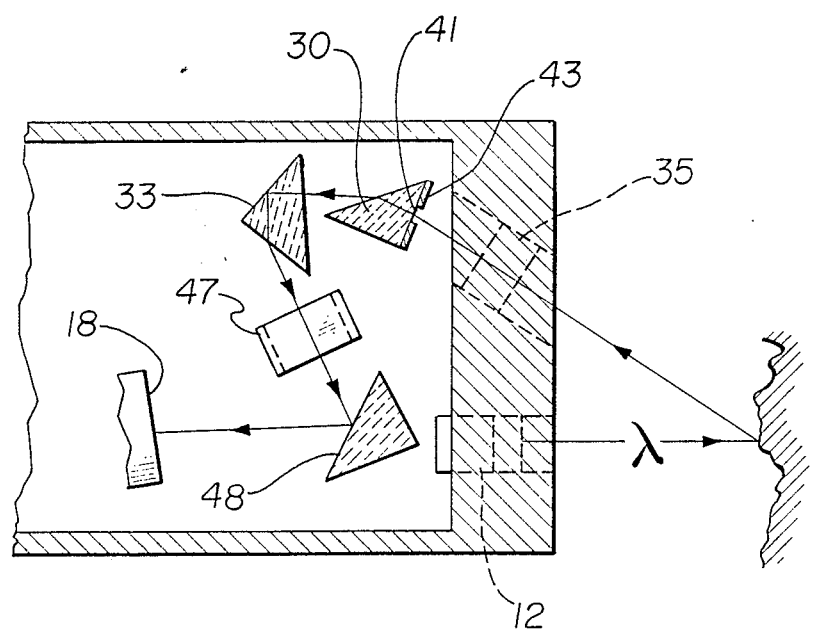
FIG. 5 is an anamorphic magnification system similar in concept and design to FIG. 4 using a mirrored reflection to enhance the compactness of the system design.

These potential problems are alleviated with the use of two prisms in tandom as shown in FIGS. 3 through 5. Using a magnification on the order of 4× for each, much better control is achieved. Since the prisms are oriented in opposition, dispersion and distortion is offset.

Shown in FIG. 3 are two such prisms 30,32 in series. The rules for differentiating the composition of two functions are:

$$\frac{dg(f(x))}{dx} = \frac{dg(f(x))}{df(x)} \cdot \frac{df(x)}{dx} \tag{5}$$

and $$\frac{d^2g(f(x))}{dx^2} = \frac{d^2g(f(x))}{df^2(x)} \cdot \frac{df(x)}{dx} + \frac{dg(f(x))}{df(x)} \cdot \frac{d^2f(x)}{dx^2} \tag{6}$$

Equation 6 applied to Snell's law indicates that two prisms 30,32 can be oriented so that the change in magnification is minimized in a neighborhood around a chosen magnification. Equation 5 indicates that the magnifications of two prisms 30,32 in tandem are multiplied together, so that a smaller magnification can be required from each. In practice this leads to two prisms 30,32 having opposite and nearly equal magnifications as shown in FIG. 3. It should be noted that by using two opposing prisms 30,32, the effects of a wavelength dependent index of refraction are greatly reduced since the changes in deflection angle A,B of the two prisms nearly cancel.

FIGS. 4 and 5 show modification of the system in FIG. 3. As shown in FIG. 4, a second prism 33 is configured in a double prism 30,33 system to use the principals discussed above and is oriented for total internal reflection in the second prism 33 to further reduce the package size. The reflecting face of the second prism may be aluminized if total internal reflection cannot be used.

FIG. 5 shows the use of a system similar to FIG. 4 with a slotted, 41, light shield, 43, secured to the receiving surface of the first prism 30 to reduce the angular spread of the input beam, and a mirrored surface 48 added to further reduce the size of the optical system and sensor package. As demonstrated by FIG. 5, this arrangement substantially reduces the package size for a given required standoff distance compared to prior art devices. By proper choice of angles between prism faces and orientations, a wide variety of magnifications, and deflections angles are possible, and can be chosen to suit the application. Also, additional prisms can be used to decease magnification variations even more, at the cost of increased size and expense. Multiple light paths through a single prism are also possible.

The technique of obtaining anarmorphic angular magnification via a single or multiple prisms are useful in other fields as well. It can be used wherever such magnification is needed and the distortions introduced by the system are acceptable. Potential uses for such a compact, low cost method of magnification include in addition to point and line range sensors, and the like, imaging systems where anamorphic magnification is required to match the size of a 2-D object to the size of a 2-D camera detector array.

The foregoing sets forth certain preferred embodiments and modifications of the invention and some of the ways in which the invention may be put into practice including the best mode presently contemplated by the inventors for carrying out this invention. Modifications of the described embodiment, other than those described, as well as alternative embodiments and devices for carrying out the invention will also be apparent to those skilled in the art. All such modifications and variations are intended to be within the spirit and scope of the followings claims.

We claim:

1. An anamorphic optical system for detecting light from a light source directed along a light source axis onto an object surface, comprising:

a collimating lens for detecting reflected light from said light source reflected off the object surface and forming said reflected light into a collimated beam, said collimating lens being spaced apart from the object surface to present a stand off distance and having a lens axis offset from said light source axis;

a prism having a first prism surface oriented generally perpendicular to said lens axis for receiving said collimated light beam, whereby the light beam is anamorphically refracted as it passes through said prism so that variations in said stand off distance present large angular shifts of the refracted light beam;

a second prism oriented to receive the refracted light from the first prism and to further anamorphically refract the light beam, said refracted light beam experiencing total internal reflection in said second prism;

a focusing lens for receiving the refracted light beam; and a detector positioned to receive the focused light beam from the focusing lens.

2. An anamorphic optical system comprising: a light source for directing a light along a light source axis onto an object surface;

a collimating lens for receiving reflected light from said light source off the object surface and forming said reflected light into a collimated beam, said collimating lens being spaced apart from the object surface to present a stand off distance;

a prism having a prism axis having a first prism surface oriented generally perpendicular to said lens axis for receiving the collimated light beam from the collimating lens such that the collimated light beam is anamorpically refracted as it passes through said prism whereby variations in said stand off distance present large angular shifts of the refracted light beam;

a second prism oriented to receive the refracted light from the first prism and to further anamorphically refract the light beam, said refracted light beam experiencing total internal reflection in said second prism;

focusing lens for receiving the refracted light beam; and a detector means upon which the focusing lens focuses the refracted light beam so that a small variations in said stand off distance causes a large shift of the focused refracted light beam on the detector means.

3. The optical system of claims 1 or 2 wherein at least one mirror is interposed between the second prism and the detector means to enhance the compactness of the optical systm.

4. The anamorphic optical system of claims 1 or 2 wherein each of the prisms anamorphically magnify the light beam in substantially the same amount.

5. The anamorphic optical system claims 1 or 2 wherein the second prism is oriented in opposition to the first prism so that dispersion due to wavelength changes in the light beam are offset and thereby minimized.

6. The anamorphic optical system of claims 1 or 2 wherein the second prism is oriented in opposition to the first prism so that distortions in magnification of the light beam are offset and therby minimized.

7. The optical system claims 1 or 2 wherein the prisms are oriented to reduce the variation in magnification caused by shifts in the object surface.

8. The optical system of claims 1 or 2 wherein the prisms are oriented to control the net deflection angle across the detector surface.

9. The prism system claims 1 or 2 wherein the shapes of the prisms are chosen to control the net deflection angle of the beam across the detector surface.

10. The optical system of claims 1 or 2 wherein internal reflection is used to control the net deflection angle of the light beam across the detector surface.

11. An anamorphic optical system for detecting light from a light source directed along a light source axis onto an object surface, comprising:
   a collimating lens for detecting reflected light from said light source reflected off the object surface and forming said reflected light into a collimated beam, said collimating lens being spaced apart from the object surface to present a stand off distance and having a lens axis offset from said light source axis;
   a prism having a first prism surface oriented generally perpendicular to said lens axis for receiving said collimated light beam, whereby the light beam is anamorphically refracted as it passes through said prism so that variations in said stand off distance present large angular shifts of the refracted light beam;
   a second prism oriented to receive the refracted light from the first prism and to further anamorphically refract the light beam;
   a focusing lens for receiving the refracted light beam;
   a detector positioned to receive the focused light beam from the focusing lens; and
   at least one mirror interposed between the second prism and the detector means to enhance the compactness of the optical system.

12. An anamorphic optical system comprising: a light source for directing a light along a light source axis onto an object surface;
   a collimating lens for receiving reflected light from said light source off the object surface and forming said reflected light into a collimated beam, said collimating lens being spaced apart from the object surface to present a stand off distance;
   a prism having a prism axis having a first prism surface oriented generally perpendicular to said lens axis for receiving the collimated light beam from the collimating lens such that the collimated light beam is anamorphically refracted as it passes through said prism whereby variations in said standoff distance present large angular shifts of the refracted light beam;
   a second prism oriented to receive the refracted light from the first prism and to further anamorphically refract the light beam;
   focusing lens for receiving the refracted light beam;
   a detector means upon which the focusing lens focuses the refracted light beam so that a small variation in said stand off distance causes a large shift of the focused refracted light beam on the detector means; and
   at least one mirror interposed between the second prism and the detector means to enhance the compactness of the optical system.

13. An anamorphic optical system for detecting light from a light source directed along a light source axis onto an object surface, comprising:
   a collimating lens for detecting reflected light from said light source reflected off the object surface and forming said reflected light into a collimated beam, said collimating lens being spaced apart from the object surface to present a stand off distance and having a lens axis offset from said light source axis;
   a prism having a first prism surface oriented generally perpendicular to said lens axis for receiving said collimated light beam, whereby the light beam is anamorphically refracted as its passes through said prism so that variations in said stand off distance present large angular shifts of the refracted light beam;
   a second prism oriented to receive the refracted light from the first prism and to further anamorphically refract the light beam;
   a focusing lens for receiving the refracted light beam; and
   a detector positioned to receive the focused light beam from the focusing lens;
   said light beam being totally internally reflected in at least one of said prisms and wherein internal reflection is used to control the net deflection angle of the light beam across the detector surface.

14. An anamorphic optical system comprising:
   a light source for directing a light along a light source axis onto an object surface;
   a collimating lens for receiving reflected light from said light source off the object surface and forming said reflected light into a collimated beam, said collimating lens being spaced apart from the object surface to present a stand off distance;
   a prism having a prism axis having a first prism surface oriented generally perpendicular to said lens axis for receiving the collimated light beam from the collimating lens such that the collimated light beam is anamorphically refracted as it passes through said prism whereby variations in said stand off distance present large angular shifts of the refracted light beam;
   a second prism oriented to receive the refracted light from the first prism and to further anamorhpically refract the light beam;
   focusing lens for receiving the refracted light beam; and
   a detector means upon which the focusing lens focuses the refracted light beam so that a small variation in said stand off distance causes a large shift of the focused refracted light beam on the detector means;
   said light beam being totally internally reflected in at least one said prisms and wherein internal reflection is used to control the net deflection angle of the light beam across the detector surface.

* * * * *